Oct. 26, 1937.  V. F. WATERS ET AL  2,097,005
EMBOSSING APPARATUS AND METHOD
Filed Jan. 23, 1935    2 Sheets-Sheet 1
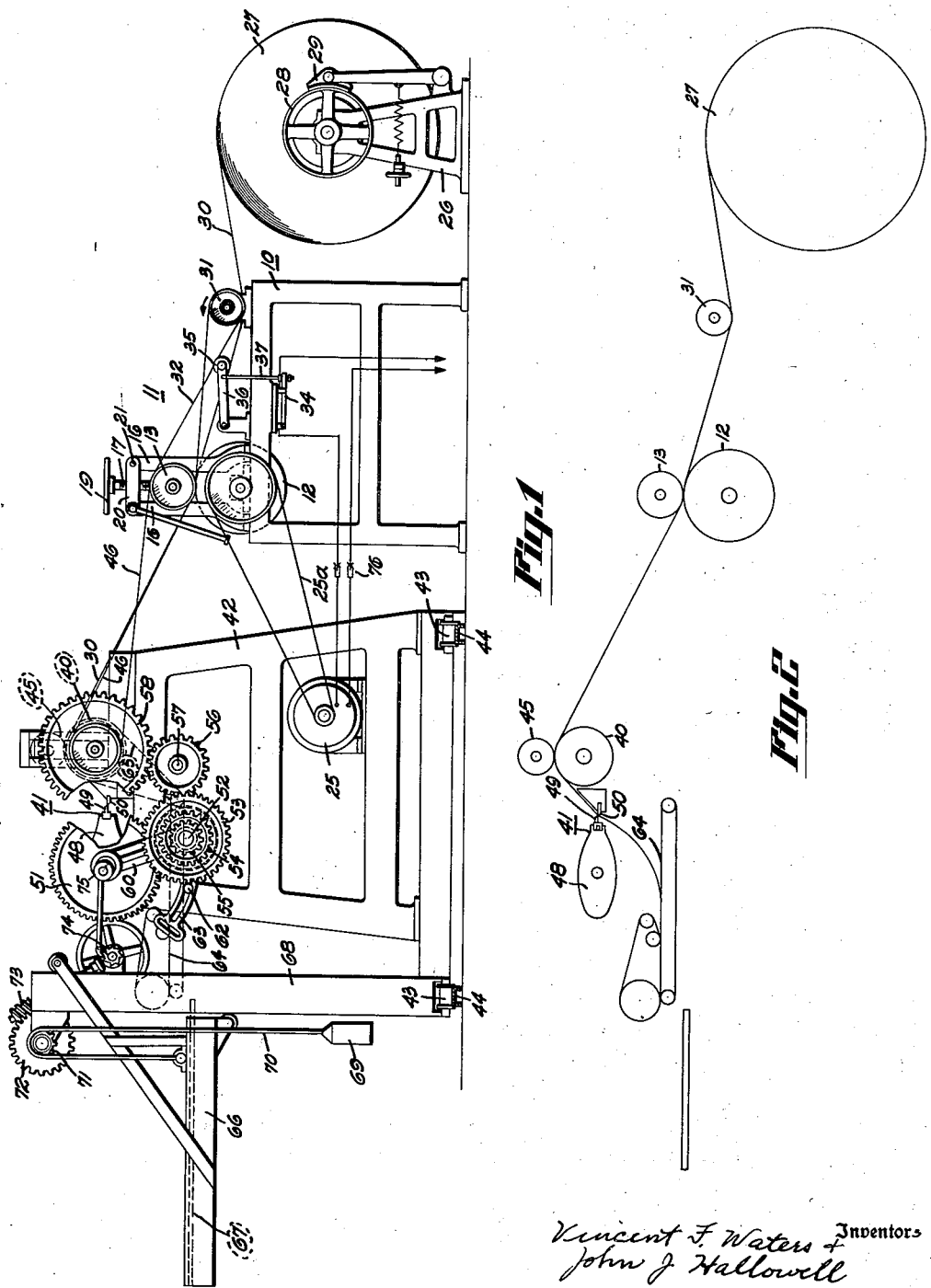
Inventors
Vincent F. Waters &
John J. Hallowell
By
Maréchal & Noe
Attorney Patented Oct. 26, 1937

2,097,005

UNITED STATES PATENT OFFICE 2,097,005

EMBOSSING APPARATUS AND METHOD

Vincent F. Waters and John Joseph Hallowell, Middletown, Ohio, assignors to The Wrenn Paper Company, Middletown, Ohio, a corporation of Ohio Application January 23, 1935, Serial No. 3,050

6 Claims. (Cl. 101—32)

This invention relates to the embossing of blotting paper and the like.

One object of the invention resides in the method of and apparatus for embossing a continuous thick web of material, such as blotting paper, and thereafter cutting the embossed web into sheets, the embossing being carried out at a paper speed of 150 feet or more per minute;

Another object of the invention is the provision of an embossing apparatus of the character mentioned, in which a continuous web of material is first embossed and then cut into sheets; the embossing, feeding, and cutting devices all being adapted for very high speed operation;

Another object of the invention is the provision of an embossing apparatus in which a continuous web of material is embossed at an unusually high speed, a number of embossing units being provided for cooperation with a feeding and cutting unit that is adapted to be moved into cooperative juxtaposition with any of the embossing units;

Other objects and advantages of the invention will be apparent from the following description, the appended claims and the accompanying drawings, in which,—

Fig. 1 is a side elevation of an embossing apparatus embodying the present invention;

Fig. 2 is a diagrammatic showing of the various steps in the embossing, feeding, cutting and other steps that are performed in accordance with the present invention;

Figure 3:
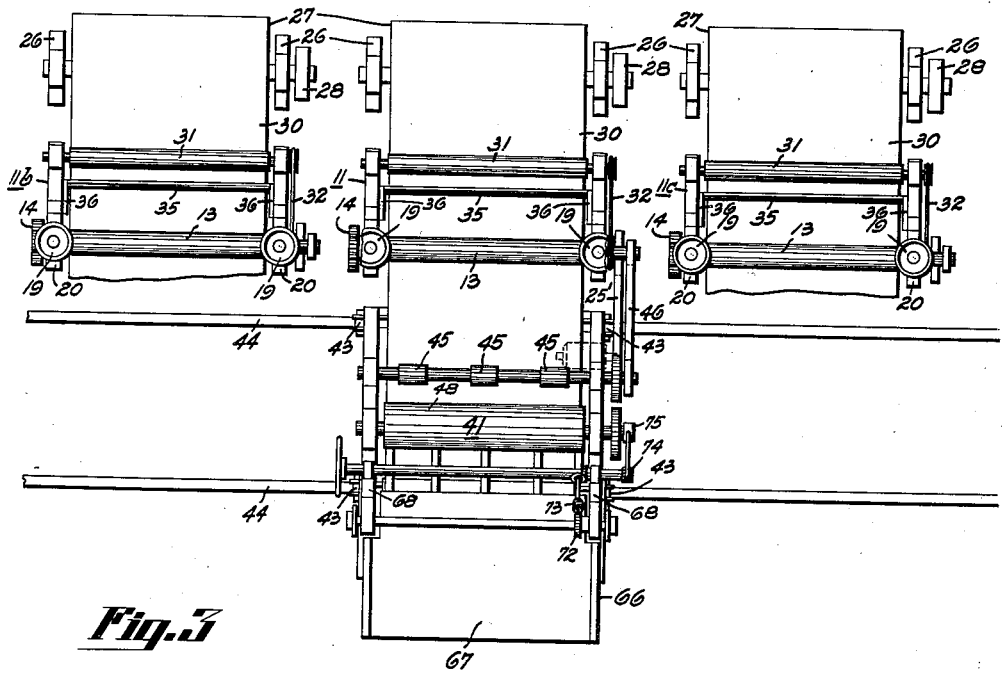
Fig. 3 is a top plan view of the embossing apparatus.
Figure 4:
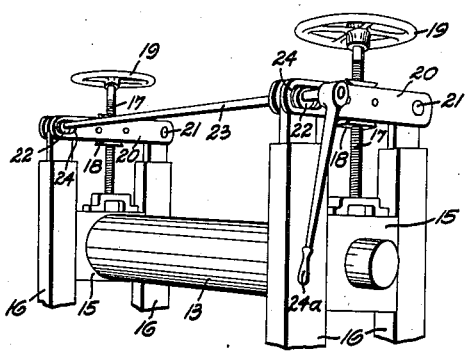
Fig. 4 is a perspective view of the upper portion of an embossing unit.

Referring more particularly to the drawings by reference numerals, 10 designates generally the frame of an embossing unit 11. Rotatably mounted on the frame 10 are lower and upper embossing rolls 12 and 13 which cooperate one with another under a suitable controlled pressure. The embossing roll 12 may be of any suitable character, but is preferably a hard roll made up of a great many layers of paper, having a surface in which the design to be produced is formed. This design may be formed in the roll 12 by running it with the roll 13 which is preferably a steel roll having a surface which is provided with the design to be reproduced. After running the two rolls 13 and 12 together under pressure the design on the surface of the roll 13 will be duplicated on the surface of the roll 12 and then both rolls can operate on a strip of material passing between them to emboss opposite sides of the strip. Gearing 14 provided on the shafts of the rolls 12 and 13 cause these rolls to operate in time with one another at the same peripheral speed.

The roll 13 is rotatably mounted at opposite ends on supporting blocks 15 which are guided for vertical movement by frame portions 16. The height of the roll 13 with relation to the roll 12 may be controlled, for adjustment of the pressure exerted by the rolls on material which passes between them, during the embossing operation. The positions of the opposed blocks 15 are positively determined by means under the control of the operator so that both ends of the roll 13 may be simultaneously and equally adjusted by a common operating device. As herein shown, each supporting block 15 is connected to a threaded rod 17 which is rotatably threaded in a nut 18 and which can be turned by the operator by means of the handwheel 19. The nut 18 is mounted on a lever 20 which is pivotally supported at 21 on one of the portions 16, the opposite end of the lever being adjustable as to height by means of an eccentric cam 22 which is provided on a cross shaft 23 and which engages a slot 24 in the arm 20. Both sides of the roll 13 are mounted in similar fashion, the cross rod 23, which may be adjusted by the control lever 24ª, serving to simultaneously and equally move both levers 20 either upwardly or downwardly to simultaneously raise or lower both ends of the roll exactly equal amounts. With an arrangement of this character the web may be threaded through the machine and the machine started up with the pressure on the embossing rolls relieved. After starting the machine in operation the pressure can then be applied by operation of the lever 24ª with the assurance that both ends of the roll 13 will be lowered similarly and equally so that equal pressure will be exerted on all parts of the web in passing through the engraving rolls.

One of the rolls is suitably driven by means of a driving motor 25 and belt 25', as shown in Fig. 1.

Adjacent the frame 10 is a support 26 on which a roll 27 of blotting paper or the like is rotatably mounted. At one end of the frame support 26 is a brake drum 28 which can be suitably secured to the roll 27 and which is engaged by a friction shoe 29 so that a suitable braking force may be applied to the roll 27 in order that a desired rather high tension in the paper web 30 can be maintained as the web passes from the roll 27 to the nip of the embossing rolls 12 and 13. Adjacent one end of the frame 10 of the embossing unit is a cylindrical roller 31 having a driving connection by means of a belt 32 or the like with roll 13, roller 31 being driven counterclockwise as shown in Fig. 1 so as to rub rearwardly against the upper surface of the web 30, acting to maintain a desired web tension ahead of the embossing rolls and as a spreading roll to keep the web free of wrinkles.

To provide a stopping means adapted to quickly stop the rotation of the embossing rolls in case a break occurs ahead of them, the motor 25 is controlled by an electric stopping switch 34 provided in the motor circuit and normally closed as long as the tension in the web is maintained ahead of the embossing rolls. The switch is held closed by means of an idler roll 35 running on the top of the web 30 and provided at the end of an arm 36 which is connected by means of a rod 37 to the switch 34. However, as soon as a break occurs in the web 30 ahead of the embossing rolls, the weight of the arm 36 and roll 35 is no longer maintained by the web itself, and these parts instantly lower so as to open the switch 34. The motor, which is provided with any known form of dynamic braking connections is then quickly stopped before the loose end of the web passes through the nip of the rolls 12 and 13. The loose end of the web would be very likely to pass through the nip of the embossing rolls in a wrinkled condition if the operation of the machine were not stopped promptly, and thus cause probable injury to those rolls.

The embossing apparatus of this invention is especially suitable for embossing blotting paper. The prior practice in the manufacture of embossed blotting paper sheets has many difficulties and objections. Heretofore it has been the practice in making embossed blotting paper sheets to first cut the web of blotting paper into sheets of the desired size and to then feed these sheets by hand to the embossing means. One operator has been required for feeding the cut sheets to the embossing means and another to take the cut sheets from the embossing means and arrange them in a suitable pile and take the piled sheets frequently to some other place. A third operator has been required to attend to the cutting of the sheets. Care had to be exercised in feeding the sheets to the embossing means to make sure that they were fed in so that the side edges of the sheet would travel in perfectly straight lines, for otherwise the sheets would be very likely to buckle or crinkle as they pass through the nip of the embossing rolls, due to the fact that a side of the sheet moved forwardly in contact with a positioning straight edge ahead of the embossing means. A buckling or wrinkling of the sheets is extremely injurious to the embossing rolls, as it must be remembered that the blotting paper web is about .027" thick and that a rather high pressure is maintained between the embossing rolls. Any doubling over or wrinkling of the sheet as it passes through the embossing rolls would therefore apply such an excessively thick quantity of material at one point along the embossing means as would injure or ruin the hard paper embossing roll that is ordinarily used in conjunction with the steel roll. Furthermore, where individual sheets are supplied to embossing rolls, the rear end of a sheet passes through the nip of the rolls in spaced relation from the entering edge of the following sheet, thus creating an injurious effect on the rolls and also producing a mashing effect on the front and rear edges of the sheets.

Another disadvantage of the usual prior practice is the roughening of the edges of the sheet caused by the handling of these edges by the operators not only in feeding the sheets to the embossing rolls, but also in taking the sheets and arranging them in piles with the edges in line after the sheets have been embossed.

As a result of all of these factors it has only been possible to attain a feeding speed of about 50 feet per minute. It was also believed that such comparatively slow speed operation was essential in the embossing of blotting paper to give sufficient time for the "setting" of the compacted sheet in order to obtain an embossed design of a permanent character.

In accordance with the present invention a very much higher speed of operation is attained than has ever been found practical in accordance with the prior practice. The speed of the embossing roll is such as to move the web at a speed of the order of 150 feet or more per minute. Very satisfactory results have been attained where the web moves at a speed of about 220 feet per minute, and this figure can be substantially exceeded if desired. Applicant has found that even with the very small time factor of web engagement with the embossing rolls the design embossed on the blotting paper is of a permanent character and does not require the application of heat to the embossing rolls or to the web.

In accordance with the present invention the blotting paper web 30 is supplied continuously to the embossing rolls 12 and 13 which compact the web from a thickness of about .027" to .022". The web is then pulled along from the nip of the embossing rolls by means of a feed roll 40 which, as herein shown is provided on a combined feeding and cutting unit designated generally 41. The unit 41 includes a frame 42 supported by means of rollers 43 which operate along tracks 44 (see Fig. 3) extending transversely to the line of web travel and adjacent the end of the embossing unit 11. The high speed at which the web is embossed provides for such a great output for any set of embossing rolls that a number of embossing roll units such as the units 11, 11b, and 11c as illustrated in Fig. 3 may be provided for a single feeding and cutting unit 41. The unit 41 may be moved along the tracks 44 so as to be positioned adjacent the end of any of the embossing units 11, 11b or 11c, as desired. The embossing rolls of the different embossing units may thus be provided with different designs and any embossing unit can be selected in accordance with the design desired. Thus when any particular design is required the embossing unit having that particular design on its rolls can be selected, and the combined feeding and cutting unit 41 is moved adjacent to the selected embossing unit and used therewith, it being unnecessary to duplicate the cutting and feeding unit for each of the several embossing units since the high speed operation of the apparatus gives such a large output as to require the use of only one embossing unit at a time. The motor 25 is supported on the cutting and feeding unit so that only one motor and one set of controls is necessary for the several embossing units, the belt 25' being readily applied to and disconnected from the motor and the driven pulley on the roll 12.

The cutting unit 41 rotatably supports the feed roll 40 and a series of short pressure rolls 45, surfaced with rubber or the like and adapted to hold the web under suitable pressure against the upper surface of the feeding roll 40. The latter is driven by a frictional drive in timed relation with the roll 13 so as to maintain a suitable tension in the web between the feeding roll 40 and the nip of the embossing rolls. The two rolls 40 and 13 are preferably interconnected by means of a drive belt 46 operating on pulleys attached respectively to the two rolls 40 and 13 and adapted to be readily applied to them or removed. The diameters of these pulleys is such that the lineal speed of the roll 40 tends to be a little in excess of the speed of the roll 13, the belt 46 slipping on the pulleys to prevent breaking of the web but giving a web tension between the embossing rolls and the feeding roll. This web tension straightens the web and thus prevents any curling up tendency of the finished sheets and is of special importance in preventing any flapping tendencies of the web such as might otherwise result at the high speed of operation.

The web is supplied from the feeding roll 40 to a cutting device including a rotatable knife arm 48 having a knife or blade 49 cooperatively arranged with respect to a fixed blade 50 so that as the arm 48 rotates the web is severed to provide a sheet of the required length each time the blade 49 comes opposite to the fixed blade 50. The arm 48 is driven by gear 51 which meshes with a gear on a shaft 52. On the shaft 52 are several other gears 53, 54, and 55 which are selectively engageable with an idler gear 56 having a fixed axis of rotation as indicated at 57. The gear 56 meshes with a gear 58 which is fixed to the feed roll 40. The several gears 53, 54, and 55 provide several different speeds of operation of the cutting knife for any speed of the feeding roll to provide for different predetermined sheet lengths. The shaft 52, as will be understood, is rotatably guided on an arm 60 which can swing about the axis of the gear 51, the position of the arm being determined by a holding means 62 provided in a slotted extension 63 of the arm 60.

After the embossed sheets are supplied to the feed roll and are then cut into sheets, the individual sheets fall on a conveyor belt 64 which is operated by suitable drive mechanism 65 in timed relation with the feeding roll 40. The conveyor belt carries the sheets to the left as viewed in Fig. 1 and deposits them one over the other on a layboy 66. The layboy 66 includes a horizontal table 67 vertically movable on a frame member 68 which is fixed to or forms a part of the frame 42 of the feeding and cutting unit. A counterbalancing weight 69 is provided on a chain 70 which operates over the sprocket 71. The latter is fixed to a gear 72 operated by a worm 73 which is driven in turn by a ratchet mechanism 74. The latter is operated from an eccentric or other drive mechanism 75 in timed relation with the cutting means so that as the sheets are stacked on the table 67, the latter constantly moves downwardly to maintain a substantially predetermined relation between the top of the pile on the table with respect to the conveyor belt 67. As the table is automatically moved, and as the conveyor belts automatically move the cut sheets to the table it is unnecessary to have an operator in constant attention at the end of the machine, a single operator being all that is required for any machine or even for a plurality of machines.

Any embossing machine unit can be very readily interconnected with the movable feeding and cutting unit after the latter is moved into cooperative juxtaposition adjacent the end of the embossing unit merely by connecting the belts 25' and 46 between the two machines and establishing the electrical connection between the stopping switch 34 and motor 25 through a suitable connection plug 76. The power drive for one of the units thus serves for operating the moving parts of the other in timed relationship.

It will now be understood that the blotting paper web supplied to the embossing rolls is supplied in such a way that any buckling or wrinkling of the web before it reaches the embossing rolls is prevented, the length of the embossing rolls being somewhat greater than the web width so that it is unnecessary to exactly position the center of the web with respect to the center of the embossing rolls. The high speed embossing rolls act on the web to give the desired imprint on both web surfaces, the web being thereafter fed to the cutting means, then severed into sheets of the desired length, and piled on the layboy. All of these various operations take place at high speed but without requiring the manual handling of the sheets or of the web. The edges of the sheets are therefore sharp and undisturbed. The invention results in a superior product, made in an exceedingly economical manner due to the large output in a given time, the considerable reduction in the amount of attention required, and the long life of the embossing rolls.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed:

1. Embossing apparatus of the character described comprising a frame, cooperating embossing rolls rotatably mounted in said frame, means for driving said rolls, means for supplying a continuous web of material to said rolls, a second frame, means supporting said second frame for movement with relation to said first frame in a direction transverse to the direction of travel of the web, feeding means rotatably mounted in said second frame and adapted to draw the web from said embossing rolls, means interconnecting the drive means of the first frame with the feeding means of the second frame for the operation of such means in timed relation, and means in said second frame for cutting the web into sheets after the web has been fed by said feeding means.

2. Embossing apparatus of the character described comprising a series of embossing units having means for embossing a continuous web of material and means for supplying a continuous web of material thereto, a combined feeding and cutting unit movable into cooperative juxtaposition in line with any of said embossing units, said feeding and cutting unit having cutting means for cutting the web into sheets and having feeding means for feeding the continuous web from the embossing unit with which it is associated to said cutting means, and drive means for coupling said cutting and feeding unit to the embossing unit with which it is associated.

3. The method of making blotting paper sheets comprising embossing a continuous web of blotting paper at a speed in excess of 150 feet per minute, maintaining a tension in the web up to the embossing step, feeding the embossed web following the embossing step to maintain the web under tension, then cutting the web into sheets, and piling the sheets one above the other.

4. Embossing apparatus for embossing a continuous thick paper web and then severing the web into sheets comprising an embossing unit having rotatable embossing rolls rotatably mounted therein, supporting means for the opposite ends of one of said rolls, means for simultaneously and equally positively moving said supporting means to vary the relative positioning of said rolls, a combined feeding and cutting unit, supporting means for said last unit providing for movement thereof in a direction transverse to the direction of web movement, said last unit having feeding means for drawing the continuous web from the nip of the embossing rolls and having means for cutting the embossed web into sheets, and means for driving the feeding and cutting means of said last unit in timed relation with said embossing rolls.

5. Embossing apparatus for embossing a continuous web of blotting paper and thereafter severing the embossed web into separate sheets comprising a pair of cooperating embossing rolls, means for positively controlling the relative spacing of the roll axes, drive means for said rolls, means for supplying a continuous web of blotting paper to the nip of said rolls, means for maintaining a tension in the web ahead of the embossing rolls, means for cutting the web into separate sheets after it passes through the nip of said rolls, feeding means for tensioning the web as it emerges from the nip of said rolls and for supplying the web to said cutting means, means for receiving the cut sheets, and means for driving said feeding and cutting means in timed relation with said embossing rolls.

6. Embossing apparatus for embossing a continuous web of blotting paper and thereafter severing the embossed web into separate sheets comprising a pair of cooperating embossing rolls, means for positively controlling the relative spacing of the roll axes, drive means for said rolls, means for supplying a continuous web of blotting paper to the nip of said rolls, means for maintaining a tension in the web ahead of the embossing rolls, means for cutting the web into separate sheets after it passes through the nip of said rolls, feeding means for tensioning the web as it emerges from the nip of said rolls and for supplying the web to said cutting means, a movable layboy for receiving the cut sheets in a pile, and means for driving said feeding and cutting means in timed relation with said embossing rolls and for moving said layboy downwardly as the pile of sheets increases thereon.

VINCENT F. WATERS.
JOHN JOSEPH HALLOWELL.